Patented Dec. 1, 1936

2,062,324

UNITED STATES PATENT OFFICE 2,062,324

METHOD OF EXTRACTION OF MORPHINE AND RELATED DERIVATIVES

George Elwood Mallory, Takoma Park, Md., assignor to The Government of The United States, as represented by the Secretary of the Treasury No Drawing. Application July 12, 1935, Serial No. 31,072

20 Claims. (Cl. 87—28)

(Granted under the act of March 3, 1883, as amended April 30, 1928; 370 O. G. 757)

The invention described herein may be manufactured and used by or for the Government of the United States for governmental purposes without the payment to me of any royalty thereon.

My invention relates generally to the extraction of morphine and other related derivatives from any morphine-bearing materials, and in particular relates to the quantitative extraction of morphine and its related derivatives from opium, poppy pods, and other parts of the poppy plant, or any other vegetable or animal matter containing morphine.

It further relates to the qualitative detection of the presence of morphine where the same has been used in drugging animals.

As introduced into this country, opium contains many impurities such as parts of the fibrous material of the poppy plant and other foreign matter introduced by the foreign exporter to increase the weight of his product. These impurities include both organic and inorganic substances.

In previous practice, and as now employed by drug manufacturers, the opium has been, and is, treated by an alkali such as lime (calcium hydroxide) in a process including substantially the following steps:

The opium-bearing product is mixed with water and lime and the mixture filtered, the filtrate containing morphine in combination with lime. The morphine in this filtrate is obtained by the addition to the filtrate of ammonium chloride which causes the morphine to be precipitated.

I have found that in this lime process a considerable percentage (approximately 10%) of the extractable morphine in the opium or other raw materials is unextracted from the mixture where it remains by virtue of its being held in a very stable chemical bond or by virtue of certain mechanical conditions present in the raw materials. For example, in one particular opium the lime process extracted 13.34% of morphine while by my improved method I was able to obtain from this same opium 14.35% of morphine.

In my process I eliminate these chemical and mechanical obstacles to the extraction of morphine by employing an initial treatment which, both chemically and mechanically, distintegrates the raw material into its elements so that whatever may be the particular extraction steps followed a greater percentage of the morphine and its related derivatives are obtained from the raw materials.

As an example of the sensitiveness and accuracy of my method as compared with other known methods a sample of 100 cc. of. of horse saliva, into which had been incorporated .00025 gm., (one-fourth of a milligram) of heroin hydrochloride by boiling, was tested by two of the usual processes for the detection of morphine which processes did not even show the presence of any morphine. When the sample was tested by my process as described hereinafter, not only the presence of morphine was noted, but also my process recovered .00017 gm. of morphine which is the equivalent morphine contained in the original .00025 gm. of heroin hydrochloride.

In my process I treat the raw material with an acid as distinguished from an alkali of the former practice, the acid being of sufficient strength, and heated to a sufficient degree to completely disintegrate the raw material as distinguished from the caking effect produced by the lime process.

In other words, I have found that raw morphine-bearing material digested in a hot strong acid solution releases more morphine and other related derivatives during the subsequent extraction process than has previously been obtained by any extraction process after treatment with lime.

The term "digested" as used above and hereinafter is to be construed as including the steps of vigorously boiling the material in the strong acid solution at such a temperature that the material is continuously stirred by the boiling action of the acid, the raw material being disintegrated rather than condensed as in the old lime process. The term "strong acid" as used above and hereinafter is to be understood as referring to those acids which are inherently active rather than the concentration thereof.

In practice I have found that this digestion occurs best at temperatures above the boiling point of water.

In order that my improved process may be fully understood, but without limiting the scope of the appended claims thereby, I will now outline the steps of one quantitative analysis as follows:

(1) 10 cc. digestion acid.
(2) Add 5 gm. opium.
(3) Add 65 cc. digestion acid.
(4) Reflux digestion 6 hrs. or more preventing charring.
(5) While still warm add 40 cc. NaOH (5 cc. 1:1 NaOH and 35 cc. H₂O)
(6) Add 250 cc. CHCl₃
(7) Reflux vigorously ½ hr.
(8) While still hot add 15 cc. CHCl₃
(9) Separation

(10) Aqueous morphine solution and undissolved matter.
   (10a) CHCl₃ and suspended particles
   (10b) Add 15 cc. H₂O
   (10c) Mix
   (10d) Separation
   (10e) Aqueous morphine solution
     (10ea) CHCl₃ for distillation
   (10f) Add to (10) as (11)
(11) Add (10f)
(12) Add 20 cc. (2×10) alk. salt sol.
(13) Heat to drive off any CHCl₃
(14) Cool
(15) Add 1:1 NaOH until slightly alkaline to place morphine in solution
(16) Mix
(17) Add 1:1 H₂SO₄ until neutral
(18) Add 3 cc. 1:1 H₂SO₄
(19) Mix
(20) Add few drops C₂H₅OH to break froth if necessary
(21) Add H₂O to make up 200 cc.
(22) Mix
(23) Settle
(24) Filter
(25) Filtrate
   (25a) Residue
   (25b) Discard
(26) 175 cc. of filtrate (⅞ aliquot)
(27) Add 45 cc. 95% C₂H₅OH
(28) Add 1:1 NaOH until slightly alkaline
(29) Add 1:1 H₂SO₄ until slightly acid to be sure that all morphine is in the form of morphine sulphate
(30) Add 28% NH₄OH until ammoniacal changing morphine sulphate to base morphine.
(31) Add 1 cc. 28% NH₄OH
(32) Immediately add 250 cc. solvent
(33) Reflux vigorously ½ hr.
(34) Separation
(35) Solvent and emulsion containing crude morphine and related alkaloids.
   (35a) Aqueous solution
   (35b) Wash with 5 cc. H₂O
   (35c) Add 1:1 H₂SO₄ until slightly acid
   (35c) Add (37c)
   (35e) Add 28% NH₄OH until ammoniacal
   (35f) Add 1 cc. 28% NH₄OH
   (35g) Add (42f)
   (35h) Reflux vigorously ½ hr. repeating process from (33) to (45)
(36) Separation
(37) Solvent and crude morphine and related alkaloids
   (37a) Emulsion
   (37b) Add 5 cc. H₂O
   (37c) Add to (35c) as (35d)
(38) Add 15 cc. of H₂O
(39) Mix
(40) Settle
(41) Separation
(42) Solvent and crude morphine and related alkaloids
   (42a) Aqueous morphine sol.
   (42b) Add 250 cc. of fresh solvent
   (42c) Mix
   (42d) Separate
   (42e) Solvent containing small amounts of crude morphine and other alkaloids.
     (42ea) Aqueous solution
     (42eb) Discard
   (42f) Add to (35f) as (35g)
(43) Distill off solvent to remaining volume of 50 cc.
(44) Evaporate remaining 50 cc.
(45) Residue containing 94% of crude morphine and other alkaloids contained in original 5 gm. of opium.
(46) Add residue from repeat of (35h)
(47) Add residue from re-repeat of (35h)
(48) Add 75 cc. CHCl₃
(49) Warm
(50) Add 25 cc. alk. salt solution
(51) Mix
(52) Settle
(53) Separate
(54) Alkaline morphine solution
   (54a) CHCl₃
   (54b) Add 10 cc. alk. salt solution
   (54c) Separate
   (54d) CHCl₃
     (54da) Alkaline morphine solution
     (54db) Add to (54)
   (54e) Add 10 cc. alk. salt solution
   (54f) Mix
   (54g) Separate
   (54h) Alkaline morphine solution
     (54ha) CHCl₃
     (54hb) Add 10 cc. H₂O
     (54hc) Mix
     (54hd) Separate
     (54he) Alkaline morphine solution
        (54hea) CHCl₃
        (54heb) Add to (10ea)
     (54hf) Add to (54h)
   (54i) Add (54he)
   (54j) Add (59a)
   (54k) Add (63a)
   (54l) Mix
   (54m) Separate
   (54n) Alkaline morphine solution
     (54na) CHCl₃
     (54nb) Add to (10ea)
   (54o) Add 25 cc. of CHCl₃
   (54p) Mix
   (54q) Separate
   (54r) Alkaline morphine solution
     (54ra) CHCl₃
     (54rb) Add to (10ea)
   (54s) Add to (63)
(55) Add (54db)
(56) Add 50 cc. of fresh CHCl₃
(57) Mix
(58) Separate
(59) Alkaline morphine solution
   (59a) CHCl₃
   (59b) Add to (54i)
(60) Add 50 cc. fresh CHCl₃
(61) Mix
(62) Separate
(63) Alkaline morphine solution
   (63a) CHCl₃
   (63b) Add to (54k)
(64) Add (54r)
(65) Add 50 cc. alk. salt solution
(66) Add litmus
(67) Add 1:1 H₂SO₄ in small portions until a brown precipitate is formed while sol. is still alkaline. Care must be taken not to allow solution to become acid.
(68) Filter
(69) Filtrate
   (69a) Residue
   (69b) Wash with 30 cc. H₂O (3×10)
   (69c) Add wash H₂O to (69) as (70)
   (69d) To residue add 50 cc. alk. salt solution (69e) Add 1:1 H₂SO₄ until brown precipitate is produced as in (67) above
(69f) Filter
(69g) Filtrate
    (69ga) Residue
    (69gb) Wash with 30 cc. H₂O (3×10)
    (69gc) Add wash H₂O to (70) with (69h)
    (69gd) Discard residue
(69h) Add to (70) as (71)
(70) Add (69c)
(71) Add (69h) and (69gc)
(72) Add 1:1 H₂SO₄ until neutral
(73) Add 1 cc. 1:1 H₂SO₄
(74) Add 60 cc. 95% C₂H₅OH
(75) Add 28% NH₄OH until ammoniacal
(76) Add 1 cc. NH₄OH
(77) Add 250 cc. solvent
(78) Reflux vigorously ½ hr.
(79) Repeat steps (33) to (45)
(80) The residue may then be weighed or titrated in the usual manner to determine the aliquot ⅞ of the morphine present in the original sample.

In the above chart the following terms are defined as follows:

Digesting acid—50 cc. H₂O plus 6 cc. conc. H₂SO₄ 1.83 Sp. Gr. plus 19 cc. H₂O.

Alkaline salt solution—Alk. salt sol.—Saturate 4% NaOH aqueous solution with anhydrous Na₂SO₄, C. P. dilute with 25% of this volume with H₂O.

Solvent—Chloroform CHCl₃—C. P. plus 12% ethyl alcohol C₂H₅OH U. S. P. grade by volume.

Sodium hydroxide—NaOH—Electrolytic sticks, 99% NaOH.

Sulphuric acid—H₂SO₄—Concentrated H₂SO₄—1.83 Sp. Gr.

Ammonia—NH₄OH—28% grade.

The foregoing analysis discloses that my process consists in a combination of a number of novel steps in the extraction of morphine from morphine-bearing raw materials in that I first digest the raw materials in a strong acid having a relatively high boiling point such, for example, as sulphuric acid (of sufficient strength to disintegrate the raw materials in the time devoted to digestion) to disintegrate and chemically break down the raw materials freeing the morphine from any chemical bond with the raw material. In practice I have used sulphuric acid of a concentration of 5% to 25% by weight and a digestion period of six hours or more.

I then neutralize a portion of the acid with a non-volatile alkali to produce a salt such for example as sodium sulphate which salt enters into the subsequent process and extract a portion of the impurities from this solution by either cold extraction or, preferably, by hot reflux extraction by an organic solvent immiscible with water such, for example, as chloroform which will not take any of the morphine from the acid solution but which will dissolve most all of the resinous and fatty impurities and a portion of the by-alkaloids, if, for example, opium is used I then increase the salt content of the solution by neutralization with a non-volatile alkali such, for example, as NaOH and add a further quantity of the non-volatile alkali either alone or in solution until the solution is slightly alkaline so that this Step 15 places all of the morphine in solution as an alkali morphinate such as sodium morphinate. At this point I prefer to eliminate only the acid precipitable impurities and, therefore, make the solution slightly acid (Steps 17 and 18 supra) with the strong acid, dilute (Step 21 supra), if necessary, to a given volume and filter (Step 24 supra), discarding the filter residue. The morphine being in solution as sodium morphinate and held in this condition because of the acidity of the solution remains in the filtrate (Step 25 supra) and the acid precipitable impurities are discarded in the residue (Steps 25a, 25b, supra).

Of the filtrate an aliquot part is taken and to this is added a water soluble alcohol as a morphine solvent, such, for example, as ethyl alcohol, in a proportion of over 10 per cent and preferably 20 per cent by volume to produce a solution of morphine in a single phase 3-component liquid system comprising water, a water soluble alcohol as the morphine solvent and a water soluble non-volatile alkaline salt produced from the neutralization of the digestion acid, in such proportions that when at a later step in the process the morphine is extracted it may be extracted by an aliphatic hydrocarbon immiscible with water, such as chloroform, containing quantities of the same water soluble alcohol used as one of the components in the single phase 3-component system above described.

By virtue of the fact that I use in the single phase 3-component system and in the solvent (chloroform plus alcohol) the same water soluble alcohol as the morphine solvent desolvent (chloroform plus alcohol) is not robbed of any alcohol. By preventing the robbing of the solvent of its alcohol content I am enabled to extract a much larger proportion of the morphine from the aqueous solution than has heretofore been possible.

The acidity of the solution is then reduced to a point which is slightly more acid than neutral by the use of a non-volatile alkali. This step also permits the volume of volatile alkaline salts produced later in the process to be maintained at a minimum which is essential for the quick and easy extraction of the morphine. To this slightly acid solution is added a volatile alkali, such as ammonium hydroxide, until the solution becomes alkaline, which changes the morphine sulphate into base morphine. The base morphine, if present in large quantities in the sample tested, will begin to precipitate.

If the material processed contains sufficiently large quantities of morphine that it is undesirable commercially to save the remainder of the morphine this precipitated morphine may be filtered off and used.

If, however, it is desirable to further extract morphine from the sample under test this precipitated morphine and any morphine in solution may then be extracted by an organic solvent preferably by hot reflux action and the solvent preferably consisting of an aliphatic hydrocarbon, such as chloroform, in which has been dissolved one of the components of the single phase 3-component system described above, namely, the water soluble alcohol as the morphine solvent.

I have found that it is better procedure to immediately add this solvent and use hot reflux in order that the morphine will not undergo a physical crystalline change rendering it more insoluble.

On separation, this solvent (35) contains substantially all of the crude morphine and some of the other alkaloids contained in the original sample. This solvent contains commercially marketable crude morphine with only a few of the other alkaloids as impurities so that it may be desired in comercial practice to stop the process at this point.

If however it is desired to obtain quantitatively all of the morphine left in the aqueous portions of the separation, these portions are reextracted in a series of steps designated in the above chart as 35a to 35h, 37a to 37c, 42a to 42f, meanwhile preserving substantially the relationships of the 3-components of the single phase aqueous system throughout the several steps, and combined with the evaporated alkaloidal residues (45) from the main separated solvent 35.

If it is desired to further purify these alkaloidal residues they are then treated with an organic liquid immiscible with water, such for example as chloroform (Step 48, supra), and completely dissolved by the addition of a non-volatile akaline salt solution containing a non-volatile alkali (Step 50, supra), my preference being a solution of sodium sulphate containing sodium hydroxide. Certain of the impurities and by-alkaloids are then extracted by the separation (Step 53 supra) of the immiscible organic liquid (chloroform) and the alkaline salt solution containing the morphine. Any traces of morphine left in the immiscible organic liquid are extracted by further additions and separations of similar salt solutions containing the non-volatile alkalis (Step 51a to 54s, inclusive, supra). These steps (54a to 54s, inclusive, supra) are repeated in accordance with the desire for accuracy in obtaining the last minute quantities of morphine present in the immiscible liquid. Meanwhile the alkaline morphine solution (Step 54, supra) may be further purified by the addition and separation of chloroform (Steps 56 to 63, inclusive, supra).

At this point I prefer to remove the alkaline precipitable impurities from the morphine by the addition to the alkaline salt solution containing the morphine a sufficient amount of sulphuric acid to produce a voluminous brown precipitate (Step 67, supra) while still maintaining the solution alkaline. I have found that if the solution becomes slightly acid the precipitate begins to go back into solution so this step is preferably carried out on the alkaline side of neutrality. The brown precipitate (69a) is then removed and the filtrate containing the morphine with only traces of impurities may be neutralized to precipitate the base morphine or, if it is desired to further purify the morphine in solution, the solution is acidified with the strong acid (Step 73, supra), is built up into another solution or single phase 3-component system of a non-volatile alkaline salt, water and water soluble alcohol as a morphine solvent, and the steps of the process (33 to 45) are repeated to extract, as far as desired, the pure morphine leaving the impurities as by-products in the solutions. If desired, the residue 69a may also be treated with steps 69d to 69gd, to obtain any slight traces of morphine.

In my process the neutralization of the sulphuric acid by a non-volatile alkali such as sodium hydroxide produces sodium sulphate which, on the addition of the water soluble alcohol (ethyl alcohol) as the morphine solvent to this aqueous solution, produces a single phase 3-component fluid system (water, sodium sulphate, the non-volatile alkaline salt, and ethyl alcohol the water soluble alcohol serving as the morphine solvent). By virtue of the relationship of water, water soluble alcohol (the morphine solvent) and the non-volatile alkaline salt, the solution is nearly saturated with respect to these latter two components so that when the solvent (chloroform plus alcohol) is added to this single phase fluid system to produce two fluid phases there is no tendency for either the 3-component system to rob the solvent of any alcohol nor does the solvent rob the 3-phase system of any alcohol, but the morphine is transferred to the alcohol in the solvent so that by separating the liquid phase the morphine is extracted from the aqueous solution and separated with the immiscible solvent. I have found that this use of alcohol in both the aqueous solution and the solvent immiscible with water is of great value where cold extraction is employed and is of exceptional value where hot reflux action is used. In the detail description of the quantitative analysis of one sample as described, supra, I have given each individual step in order to show how the last traces of morphine may be extracted from the sample under test. Commercially it may not be desirable to follow these detail steps individually, but allow certain waste of morphine. It is to be understood that such omission of steps or short-cuts, many of which are known to me, in the above described detail quantitative analysis may be made without departing from the spirit of the claims appended hereto.

It is to be understood further that many modifications and simplifications of the above process are known and have been employed by me and are to be considered as being included in the claims appended hereto.

Having thus described my invention what I claim is:

1. In a process for the extraction of morphine, the steps of digesting the raw morphine-bearing materials in a strong mineral acid solution of over 5% acid by weight for a sufficient length of time at temperatures elevated above that of the temperature of boiling water in order to chemically and mechanically disintegrate the raw materials, extracting resinous and fatty impurities with an organic solvent immiscible with water, separating the acid precipitable impurities, making the solution alkaline with a non-volatile alkali, making the solution slightly acid, making the solution ammoniacal, extracting the morphine together with certain by-alkaloids and small amounts of impurities in a single phase 3-component system of a non-volatile alkaline salt, water and a water soluble alcohol morphine solvent by an immiscible solvent containing one of the components of the single phase 3-component system, separating the morphine from the by-alkaloids and other impurities by a solution of a non-volatile alkali containing a non-volatile alkaline salt, purifying the morphine by precipitating the alkaline precipitable impurities, and extracting the morphine from the single phase 3-component system by an immiscible solvent.

2. In a process for the extraction of morphine, the steps of digesting the raw morphine-bearing materials in a strong mineral acid solution of a concentration between 5% and 15% acid by weight for a sufficient length of time at temperatures about 100° C. to chemically and mechanically disintegrate the raw materials, extracting resinous and fatty impurities with a solvent immiscible with water, making the solution alkaline with a non-volatile alkali, making the solution slightly acid, making the solution ammoniacal, extracting the morphine together with certain by-alkaloids and small amounts of impurities in a single phase 3-component system of a non-volatile alkaline salt, water and a water soluble alcohol morphine solvent by an immiscible solvent containing one of the components of the single phase 3-component system, separating the morphine from the by-alkaloids and other impurities by a solution of a non-volatile alkali containing a non-volatile alkaline salt, and extracting the morphine in a single phase 3-component system by an immiscible solvent.

3. In a process for the extraction of commercial grade morphine, the steps of digesting the raw morphine-bearing materials in a strong mineral acid solution of a concentration of over 5% acid by weight for a sufficient length of time at temperatures above 100° C. to chemically and mechanically disintegrate the raw materials, extracting resinous and fatty impurities with a solvent immiscible with water in which solvent morphine salts are substantially insolvent, making the solution alkaline, extracting the morphine together with certain by-alkaloids and small amounts of impurities in a single phase 3-component system of a non-volatile alkaline salt, water and a water soluble alcohol by an immiscible solvent containing one of the elements of the single phase 3-component system in which the morphine is soluble, separating the morphine from the by-alkaloids and other impurities by a solution of a non-volatile alkali containing a non-volatile alkaline salt, and extracting the morphine in a single phase 3-component system by an immiscible solvent.

4. In a process of extracting alkaloids, the steps of first digesting the raw materials in an acid solution having a concentration of acid 5 to 25% by weight, extracting resinous and fatty impurities from the acid solution by an immiscible solvent in which the morphine is substantially insoluble, making the acid solution ammoniacal and extracting all the alkaloids from the ammoniacal solution.

5. In a process of extracting morphine, the steps of first digesting the raw materials in a mineral acid solution of over a concentration of 5% acid by weight solution, extracting resinous and fatty impurities from the acid solution being a solvent immiscible with water having the physical characteristics of chloroform leaving the morphine in the acid solution, making the acid solution ammoniacal, extracting all the alkaloids including the morphine from the ammoniacal solution, dissolving the alkaloids in a solvent immiscible with water containing a morphine solvent and extracting the morphine from the solvent by a solution containing a non-volatile alkali.

6. In a process of extracting morphine and codeine, the steps of first digesting the raw materials in an acid solution containing a mineral acid of at least 5% by weight, extracting resinous and fatty impurities from the acid solution being a solvent immiscible with water having the physical characteristics of chloroform while leaving the morphine and codeine in said acid solution, making the acid solution ammoniacal, extracting all the alkaloids from the ammoniacal solution, dissolving the alkaloids in a solvent immiscible with water and extracting the morphine from the solvent by an alkaline solution containing a non-volatile alkali and a non-volatile alkaline salt.

7. In a process of extracting morphine, the steps of first digesting the raw materials in an acid solution having an acid concentration of 5 to 25% by weight, extracting impurities from the acid solution, making the acid solution ammoniacal, extracting all the alkaloids from the ammoniacal solution by means of a solvent containing chloroform and alcohol, and extracting the morphine from the chloroform alcohol by an alkaline solution containing a non-volatile alkaline salt.

8. In the process of extracting morphine from raw materials, the steps of producing a solution of morphine in a single phase 3-component system including a water, an alcohol soluble in said water and a non-volatile alkaline salt soluble in said organic solvent, and extracting the morphine from the single phase 3-component system by a solvent immiscible with water but containing at least 12% of alcohol.

9. In the process of extracting morphine from raw materials, the steps of producing a solution of morphine in a single phase 3-component system including a water, an alcohol soluble in said water and a non-volatile alkaline salt soluble in said organic solvent, and extracting the morphine from the single phase 3-component system by a solvent containing chloroform and alcohol.

10. In a process of extracting morphine, the steps of producing a solution of morphine in a single phase 3-component system comprising water, a water soluble alcohol and a sulphate of a non-volatile alkali, and extracting the morphine from the single phase 3-component system by a solvent.

11. In a process of extracting morphine, the steps of producing a solution of morphine in a single phase 3-component system comprising water, a water soluble alcohol and a sulphate of a non-volatile alkali, and extracting the morphine from the single phase 3-component system by chloroform containing a water soluble alcohol.

12. The process of extracting morphine bearing alkaloids from morphine-bearing materials which consists in digesting the morphine-bearing materials with a strong acid at least 5% acid by weight, neutralizing the acid and extracting the alkaloids in a solvent comprising chloroform and alcohol.

13. In a process for extracting morphine from an aqueous solution, the steps of saturating the aqueous solution with a sulphate of a non-volatile alkali, making the solution ammoniacal, heating the solution, and extracting the morphine from the ammoniacal solution by an immiscible solvent containing a water soluble alcohol morphine solvent while hot.

14. In a process for the extraction of morphine from an aqueous solution by an immiscible solvent comprising an aliphatic hydrocarbon carrying a water soluble alcohol in which the morphine is soluble, the step of previously fortifying the solution with respect to the solvent by the addition of alcohol whereby the solution does not extract any water soluble alcohol from the solvent.

15. A process for the extracting of morphine from morphine-bearing materials which consists in digesting the raw materials with sulphuric acid of a concentration of at least 5% acid by weight, neutralizing the sulphuric acid, adding a non-volatile alkaline salt and alcohol to produce a single phase 3-component system and extracting the morphine from said single phase 3-component system by an immiscible solvent saturated with respect to the single phase 3-component system.

16. In a process of producing morphine the steps of digesting the raw materials in a strong acid, extracting the morphine in a solvent immiscible with water and extracting the morphine from the solvent by means of an alkaline solution containing a non-volatile alkaline salt having the radical of the digestion acid.

17. In a process for the production of morphine, the step of extracting the morphine from a solvent immiscible with water by a dilute solution of a non-volatile hydroxide saturated with an alkaline sulphate.

18. In a process for treating morphine-bearing materials, the step of vigorously boiling the raw materials in an aqueous solution containing from 5 to 25% acid by weight to liberate the morphine.

19. In a process for the extraction of morphine from morphine-bearing materials the step of vigorously boiling the raw materials in an aqueous solution containing from 5 to 25% acid by weight to place the morphine in solution.

20. A process for the qualitative extraction of morphine, the steps of digesting the raw materials in an aqueous solution containing from 5 to 25% acid by weight to liberate the morphine held in chemical union or chemical bond with other organic materials, neutralizing the acid and extracting the morphine from the salts so produced.

GEORGE ELWOOD MALLORY.